US008164769B2

(12) United States Patent
Yamada et al.

(10) Patent No.: US 8,164,769 B2
(45) Date of Patent: Apr. 24, 2012

(54) IMAGE FORMING APPARATUS WITH VIBRATION DETECTION AND CONTROL

(75) Inventors: Tatsutoshi Yamada, Toyokawa (JP); Tatsuya Eguchi, Toyohashi (JP); Kiyohito Tsujihara, Hoi-gun (JP); Hiroshi Eguchi, Okazaki (JP)

(73) Assignee: Konica Minolta Business Technologies, Inc., Chiyoda-Ku, Toyko (JP)

( * ) Notice: Subject to any disclaimer, the term of this patent is extended or adjusted under 35 U.S.C. 154(b) by 1216 days.

(21) Appl. No.: 11/923,695

(22) Filed: Oct. 25, 2007

(65) Prior Publication Data

US 2008/0112007 A1 May 15, 2008

(30) Foreign Application Priority Data

Nov. 14, 2006 (JP) ................................ 2006-308400

(51) Int. Cl.
*G06K 15/00* (2006.01)

(52) U.S. Cl. ....................... 358/1.14; 358/1.15; 711/162

(58) Field of Classification Search .................... 399/72; 347/248; 358/174, 447; 711/162; 359/238
See application file for complete search history.

(56) References Cited

U.S. PATENT DOCUMENTS 5,457,518 A 10/1995 Ashikaga et al.
6,349,185 B1 * 2/2002 Burkes et al. .................. 399/72
6,529,697 B1 * 3/2003 Burkes et al. .................. 399/72
6,845,435 B2 * 1/2005 Nagasawa et al. ............ 711/162
6,970,277 B1 * 11/2005 Makishima .................. 359/238
2002/0044198 A1 * 4/2002 Miyazaki ...................... 347/248
2002/0140994 A1 * 10/2002 Kimura ......................... 358/474
2003/0068170 A1 * 4/2003 Burkes et al. .................. 399/72

FOREIGN PATENT DOCUMENTS

JP 7141308 A 6/1995
JP 8-316955 A 11/1996
JP 10-11242 1/1998
JP 2000-19895 A 1/2000
JP 2001-23060 A 1/2001
JP 2002-326342 11/2002

OTHER PUBLICATIONS

European Search Report issued in corresponding European Patent Application No. 07021648.6, dated Oct. 1, 2010.

* cited by examiner

*Primary Examiner* — Twyler Haskins
*Assistant Examiner* — Nicholas Pachol
(74) *Attorney, Agent, or Firm* — Buchanan Ingersoll & Rooney PC

(57) ABSTRACT

A Multi-Functional Peripheral (MFP) comprising: a registration adjuster for making a registration adjustment by adjusting an image forming position of each color; a detector for detecting an intensity of a vibration; a transmitter for transmitting the image data to another apparatus via a network; and a controller for (i) interrupting an image formation if the intensity of the vibration is judged to be larger than a first threshold, (ii) instructing the transmitter to transmit the image data of the interrupted image formation to the another apparatus if the intensity of the vibration is judged to be larger than a second threshold that is larger than the first threshold, and (iii) after the vibration has ceased, instructing the registration adjuster to make the registration adjustment and then restarting the interrupted image formation.

6 Claims, 11 Drawing Sheets

IMAGE FORMING APPARATUS WITH VIBRATION DETECTION AND CONTROL

This application is based on application No 2006-308400 filed in Japan, the contents of which are hereby incorporated by reference.

BACKGROUND OF THE INVENTION (1) Field of the Invention

The present invention relates to an image forming apparatus, and more particularly, to technology for forming a high-quality image even after an earthquake.

(2) Related Art

Along with the widespread use of image forming apparatuses in recent years, there are increasing cases of them being hit by an earthquake. Accordingly, a demand for earthquake-safe image forming apparatuses is getting higher every year. In satisfaction of this demand, various technologies for realizing such apparatuses have been proposed.

Among such technologies, one introduces a technology for judging an earthquake intensity with an earthquake detector, and for controlling an image processing apparatus based on the judgment result, so that an image to be output receives no harm from the earthquake. This technology causes a printing sequence to be interrupted when the earthquake intensity hits or exceeds a threshold, and to be restarted when the earthquake ceases and its intensity returns to the threshold or below. As a result, various drawbacks of an image forming process during the earthquake, such as a paper jam and degradation of image quality, can be avoided (see Japanese Laid-Open Patent Application Publication No. 2000-019895).

However, there still remains a problem; following the earthquake, the restarted printing sequence does not always output a high-quality image.

SUMMARY OF THE INVENTION

In view of the above problem, it is an object of the present invention to provide an image forming apparatus that forms a high-quality image after the earthquake has ceased.

To realize the above object, the present invention provides an image forming apparatus for forming a color image on a recording medium in accordance with image data, the image forming apparatus comprising: a registration adjuster for making a registration adjustment by adjusting an image forming position of each color; a detector for detecting an intensity of a vibration; a transmitter for transmitting the image data to another apparatus via a network; and a controller for (i) interrupting an image formation if the intensity of the vibration is judged to be larger than a first threshold, (ii) instructing the transmitter to transmit the image data of the interrupted image formation to the another apparatus if the intensity of the vibration is judged to be larger than a second threshold that is larger than the first threshold, and (iii) after the vibration has ceased, instructing the registration adjuster to make the registration adjustment and then restarting the interrupted image formation.

The above structure yields the following advantages. During the earthquake, the image formation is interrupted; this prevents the image forming apparatus from degrading image Duality due to a direct effect of an earthquake-induced vibration. Furthermore, after the earthquake is over, the image forming apparatus makes a registration adjustment prior to the image formation. This prevents color shifts resulting from the earthquake.

When the earthquake is intense, the transmitter of the image forming apparatus transmits the image data of the interrupted image formation to the another apparatus. Therefore, even in a case where the image forming apparatus is unable to restart the image formation because of the earthquake, the another apparatus can form the image using the image data that has been transmitted thereto. This is how the image forming apparatus forms a high-quality image after the earthquake has ceased.

Here, it is desirable for the image forming apparatus to include a scanner for generating the image data by scanning an original, wherein the controller instructs the transmitter to transmit only the image data generated by the scanner to the another apparatus. This construction reduces the time needed to transmit the image data by reducing an amount of the data to be transmitted to the another apparatus. As a result, the transmission of the image data can be completed before it is disabled by the earthquake.

Preferably in the image forming apparatus, after the vibration has ceased, the controller acquires the image data that has been transmitted to the another apparatus and restarts the interrupted image formation using the acquired image data. This way, the image forming apparatus can form the image after the earthquake has ceased, even in a case where the earthquake has corrupted the image data by, for example, partially damaging a hard disc of the image forming apparatus.

Here, it is desirable for the image forming apparatus to include an inquirer for submitting an inquiry to the another apparatus via the network about whether the another apparatus has detected vibration, wherein if the intensity of the vibration is judged by the image forming apparatus to be larger than the second threshold, the controller instructs the inquirer to submit the inquiry to the another apparatus about whether the another apparatus has detected the vibration, and if the another apparatus has not detected vibration, the controller instructs the transmitter to transmit the image data of the interrupted image formation to the another apparatus. This construction allows the image forming apparatus to transmit the image data to the another apparatus that is undamaged by the earthquake and thus is able to carry on the image formation safely. This way the image data can be more definitively transmitted to the another undamaged apparatus after the earthquake has ceased.

The image forming apparatus further includes a finisher that includes a plurality of catch trays and slides up and down according to which one of the plurality of catch trays receives the recording medium with the color image formed thereon, wherein if the intensity of the vibration is judged to be larger than the first threshold, the controller instructs the finisher to slide down to a lowest point. In this implementation, the image forming apparatus has less chance of falling down due to the earthquake, and thus is able to form the high-quality image after the earthquake has ceased.

BRIEF DESCRIPTION OF THE DRAWINGS

These and other objects, advantages and features of the invention will become apparent from the following description thereof taken in conjunction with the accompanying drawings those illustrate a specific embodiment of the invention.

In the drawings.

DESCRIPTION OF PREFERRED EMBODIMENT

The following describes the embodiment of the image forming apparatus of the present invention with reference to the drawings, taking a Multi Function Peripheral (MFP) as an example of the image forming apparatus.

[1] Structure of MFP

Described below is a structure of the MFP of the present embodiment.

Figure 1:
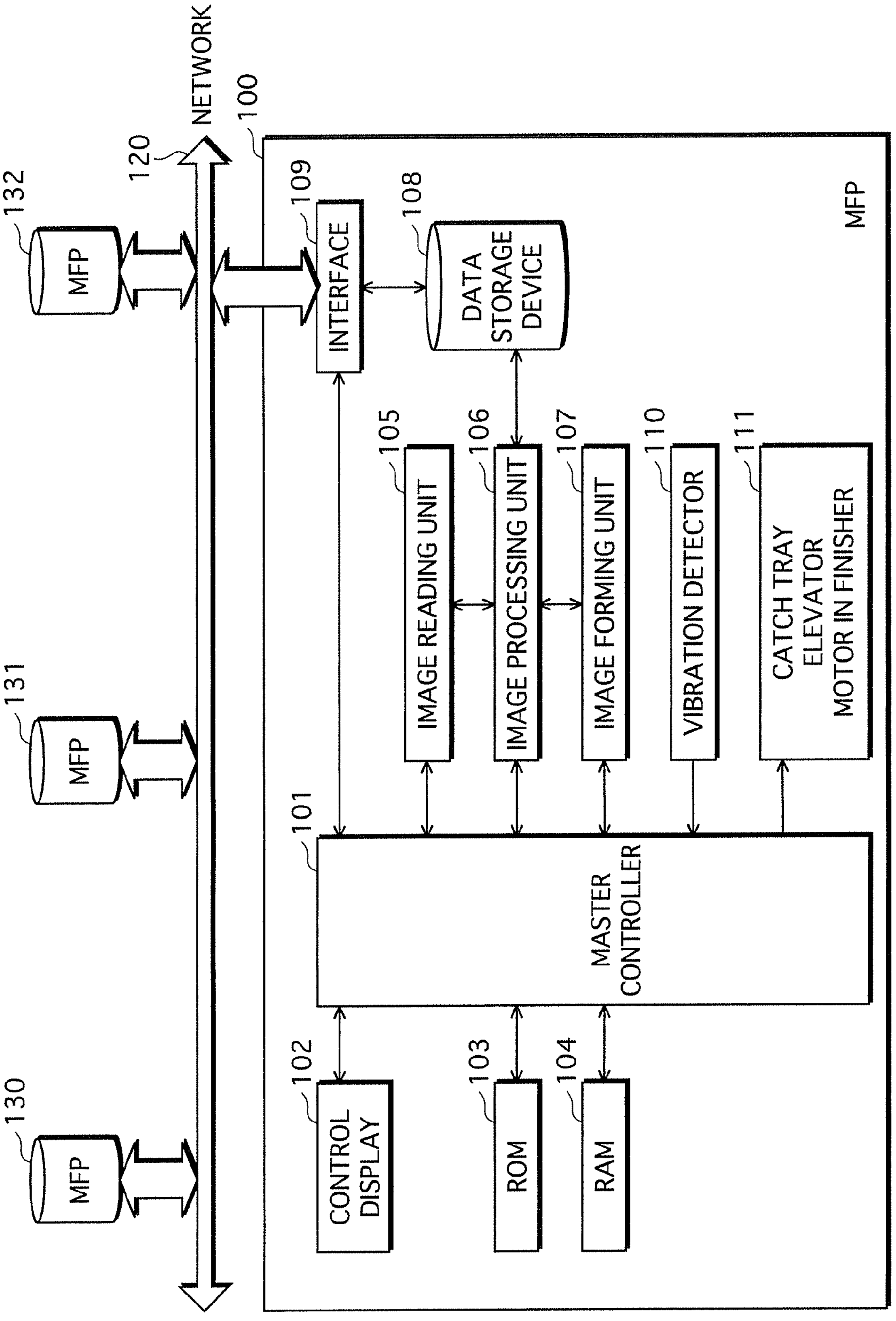
FIG. 1 is a block diagram illustrating an overall structure of a Multi Function Peripheral (MFP) relating to an embodiment of the present invention.

FIG. 1 is a block diagram illustrating an overall structure of the MFP of the present embodiment. As shown in FIG. 1, an MFP 100 of the present embodiment includes: a master controller 101; a control display 102; a Read Only Memory (ROM) 103; a Random Access Memory (RAM) 104; an image reading unit 105; an image processing unit 106; an image forming unit 107; a data storage device 108; an interface (IF) 109; a vibration detector 110; and a catch tray elevator motor in finisher 111. The MFP 100 inter-communicates with the MFPs 130 through 132 via a network 120.

The master controller 101 controls the MFP 100 in whole. The control display 102 receives a wide variety of operation requests and settings (i.e., inputs) from a user of the MFP 100, and displays various information (e.g., confirmation messages and warnings) to the user. The ROM 103 and the RAM 104 are used as memories when components of the MFP 100, such as the master controller 101, perform various processes.

In response to an instruction that has been received at the control display 102, the image reading unit 105 reads an image from an original and convert the image to electronic data. The image processing unit 106 performs various image processing tasks on the electronic data that has been read in the image reading unit 105. The image forming unit 107 prints the electronic data, which has been processed in the image processing unit 106, on a recording paper in an electrophotographic process.

The data storage device 108 is a high capacity storage device that stores, for example, the electronic data that has been processed in the image processing unit 106. The interface (IF) 109 performs a process for intercommunicating with the MFPs 130 through 132 and the like via the network 120. The MFPs 130 through 132 are each capable of detecting a vibration caused by an earthquake and other events.

The vibration detector 110 detects the vibration caused by an earthquake and other events. The catch tray elevator motor in finisher 111 slides the catch trays up and down, so that the finisher can discharge a printed recording material onto a desired catch tray.

[2] Structure of Vibration Detector 110

The following describes a structure of the vibration detector 110.

Figure 2:
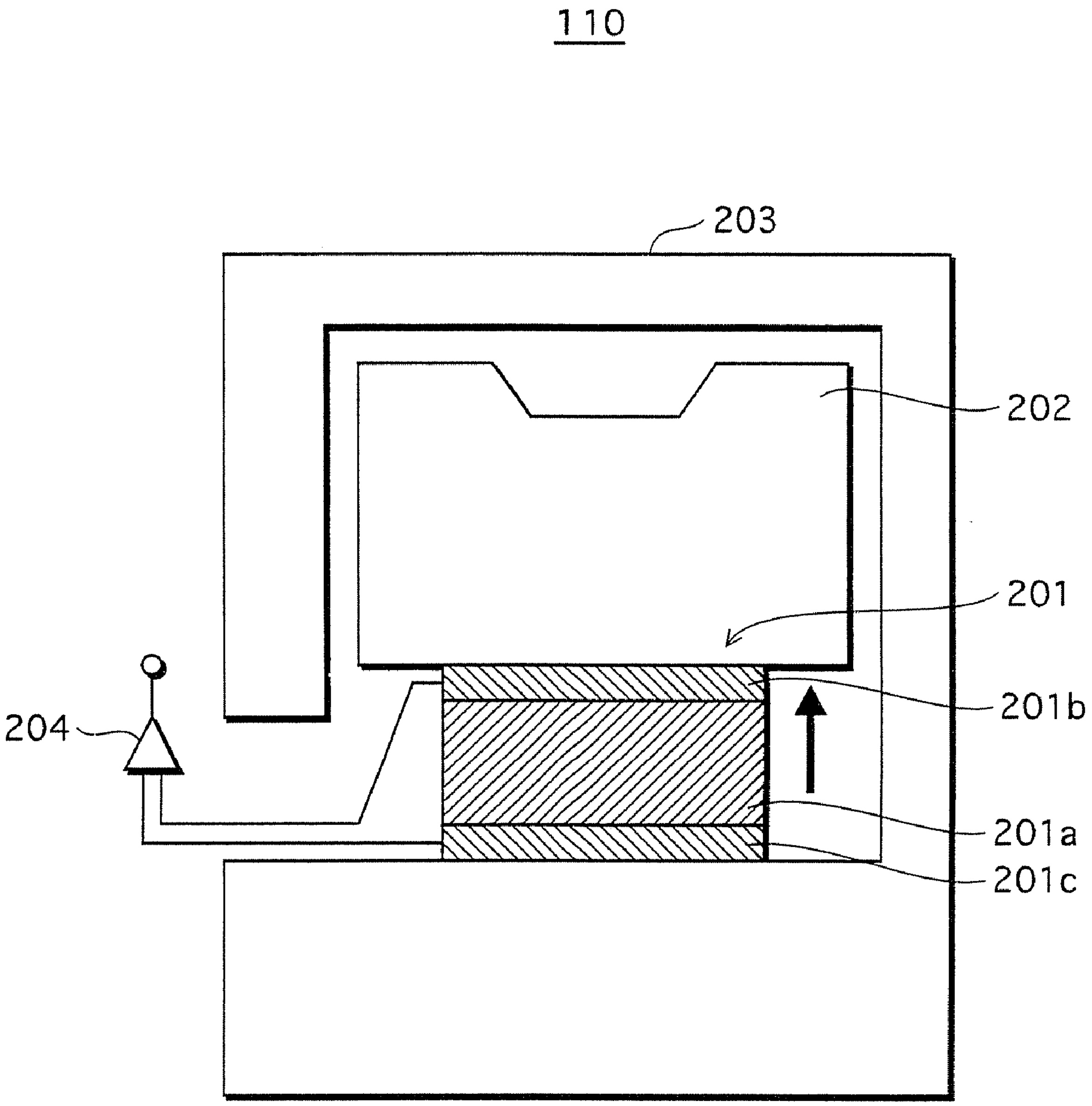
FIG. 2 is a cross-sectional view illustrating a main structure of a vibration detector 110 in the MFP relating to the embodiment of the present invention.

FIG. 2 is a cross-sectional view illustrating a main structure of the vibration detector 110. As shown in FIG. 2, the vibration detector 110 includes: a piezoelectric element 201; a weight 202; a base 203; and an amplifier 204.

The piezoelectric element 201 is comprised of a piezoelectric material 201*a* whose both ends in a polarization direction are attached to electrodes 201*b* and 201*c*. The weight 202 is fixedly mounted on top of the piezoelectric element 201. The piezoelectric element 201 and the weight 202 are placed within the base 203, so as to be unharmed by and, protected from an external shock.

When the earthquake occurs, the piezoelectric element 201 shifts due to the earthquake shaking, as the piezoelectric element 201 is fixedly mounted on the MFP 100 via the base 203. On the other hand, the weight 202 tries to stay in the same position in accordance with the law of inertia.

That is to say, the piezoelectric material 201*a* is sandwiched between the electrode 201*c*, which shifts together with the base 203, and the electrode 201*b*, which tries to stay in the same position together with the weight 202. Consequently, the earthquake shaking causes the piezoelectric material 201*a* to be compressed and expanded, and to generate a voltage in proportion to an extent of the earthquake shaking.

The voltage generated by the piezoelectric element 201 is increased by the amplifier 204.

[3] Finisher

The following is a description of the finisher included in the MFP 100.

Figure 3:
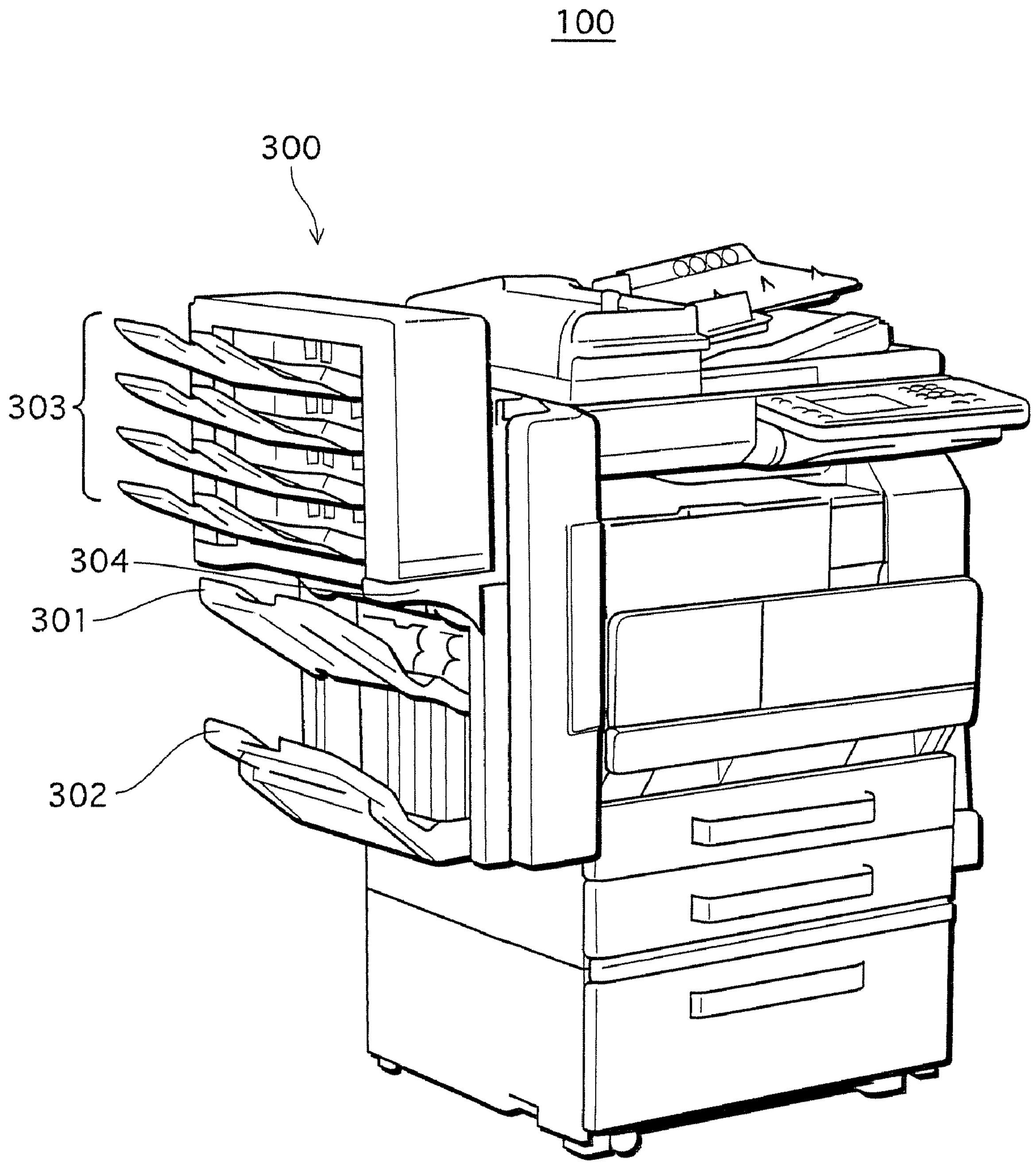
FIG. 3 is an external perspective view illustrating an MFP 100 relating to the embodiment of the present invention, with a finisher 300 of the MFP 100 being positioned at a lowest point (home position)

FIG. 3 is an external perspective view illustrating the MFP 100 of the present embodiment. As shown in FIG. 3, the MFP 100 is equipped with a finisher 300. The finisher 300 is comprised of: a first catch tray 301; a second catch tray 302; a mailbox tray 303; and a catch tray cover 304.

Recording papers that have been printed in a non-sorting mode are discharged onto the first catch tray 301, whereas recording papers that have been printed and sorted are discharged onto the second catch tray 302. Printed recording papers are discharged onto the mailbox tray 303 as well.

The catch tray cover 304 can be opened for clearing a paper jam. The mailbox tray has a paper jam door (not illustrated) on a backside thereof; the paper jam door can be also opened for clearing a paper jam.

When a user selects the first catch tray 301, the second catch tray 302, or the mailbox tray 303 as a destination for the MFP 100 to discharge the recording paper, the finisher 300 slides up or down depending on the selected destination.

FIG. 3 shows the finisher 300 being positioned at a home position, namely, a lowest point. With the finisher 300 being at the home position, a center of gravity of the MFP 100 is at the lowest point, making the MFP 100 less likely to fall down.

Figure 4:
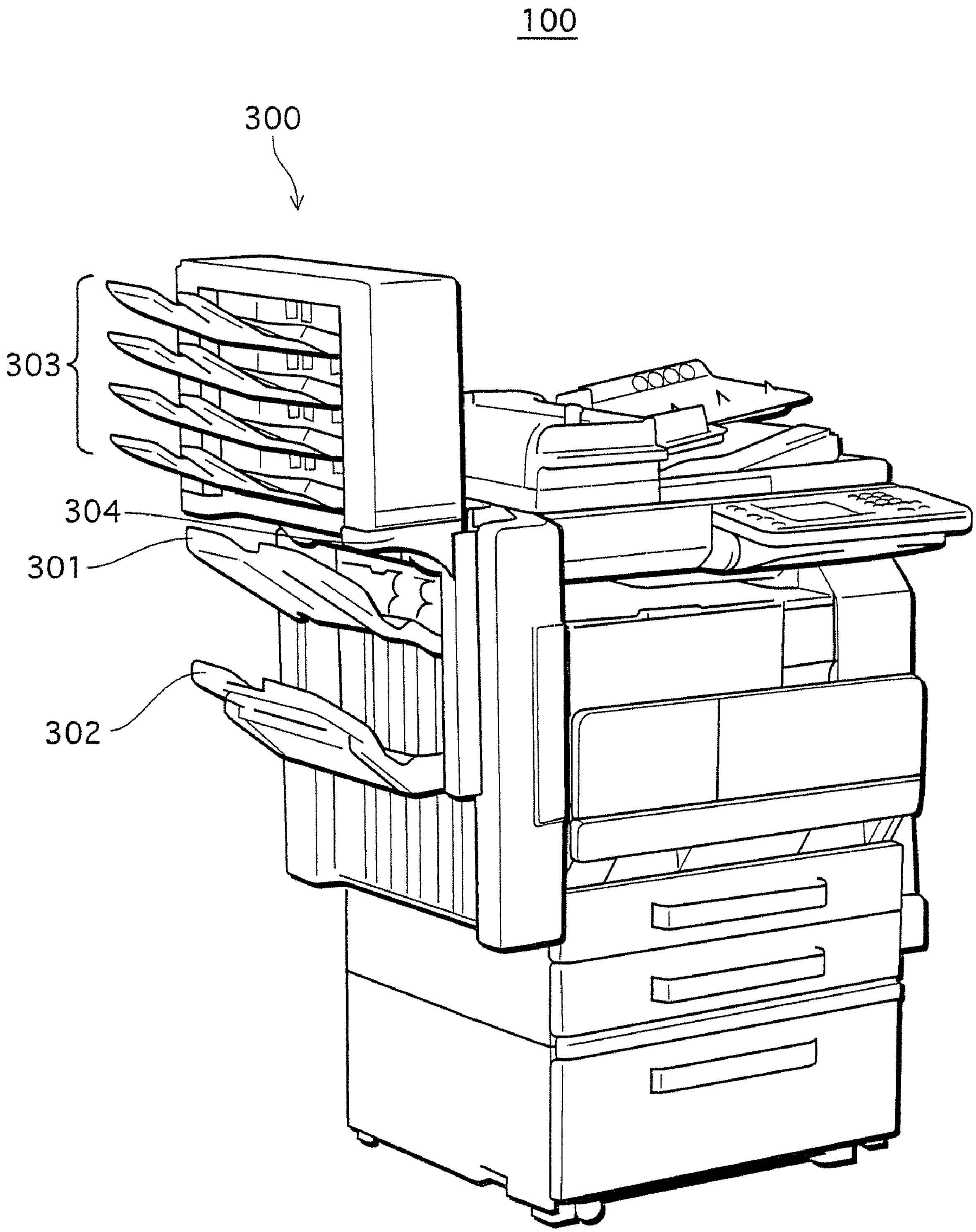
FIG. 4 is a perspective view illustrating an external view of the MFP 100 relating to the embodiment of the present invention, while the finisher 300 of the MFP 100 is being positioned at a highest point.

FIG. 4 shows the finisher 300 being positioned at a highest point. When the finisher 300 is positioned at the highest point, the center of gravity of the MFP 100 is accordingly at the highest point, making the MFP 100 more likely to fall down due to the earthquake and other reasons. It is dangerous especially when there are few recording papers left in a paper feed cassette that is set in a lower part of the MFP 100, which is another factor that makes the center of gravity of the MFP 100 higher.

[4] Operation of MFP 100

Described below is an operation of the MFP 100.

Figure 5:
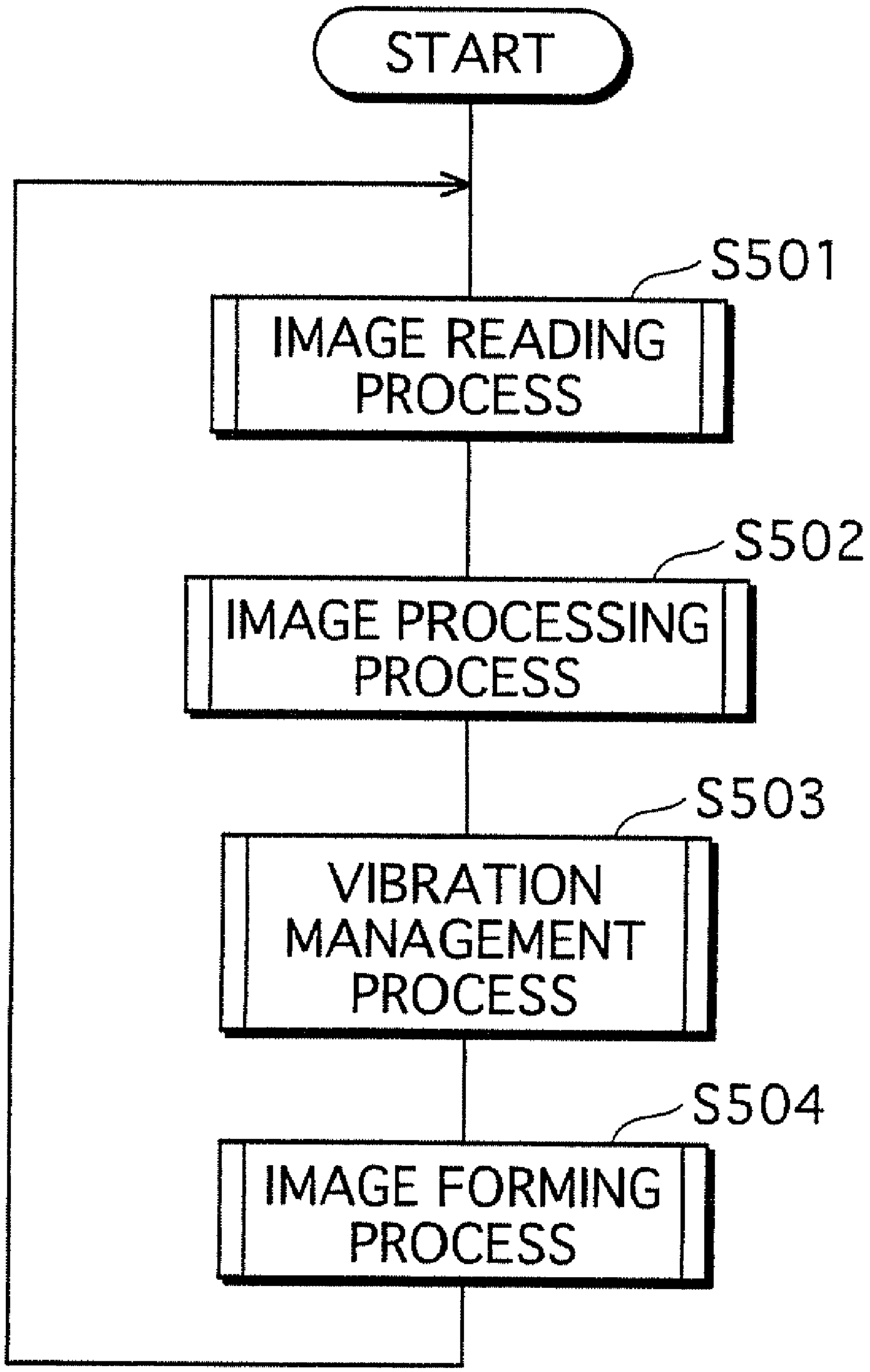
FIG. 5 is a flowchart of an operation of the MFP 100 relating to the embodiment of the present invention.

FIG. 5 is a flowchart of the operation of the MFP 100. As shown in FIG. 5, the MFP 100 repeats the following processes in listed order: an image reading process (S501); an image processing process (S502); a vibration management process (S503); and an image forming process (S504).

The image reading process (S501) is a process for reading the original in response to the user instruction and generating electronic data. The image processing process (S502) is a process for performing an image processing on the electronic data generated in the image reading process (S501). The vibration management process (S503) is a process for detecting vibration and performing a control task in accordance with intensity of the vibration. The image forming process (S504) is a process for forming an image in response to the user instruction.

[5] Vibration Management Process (S503)

Figure 6:
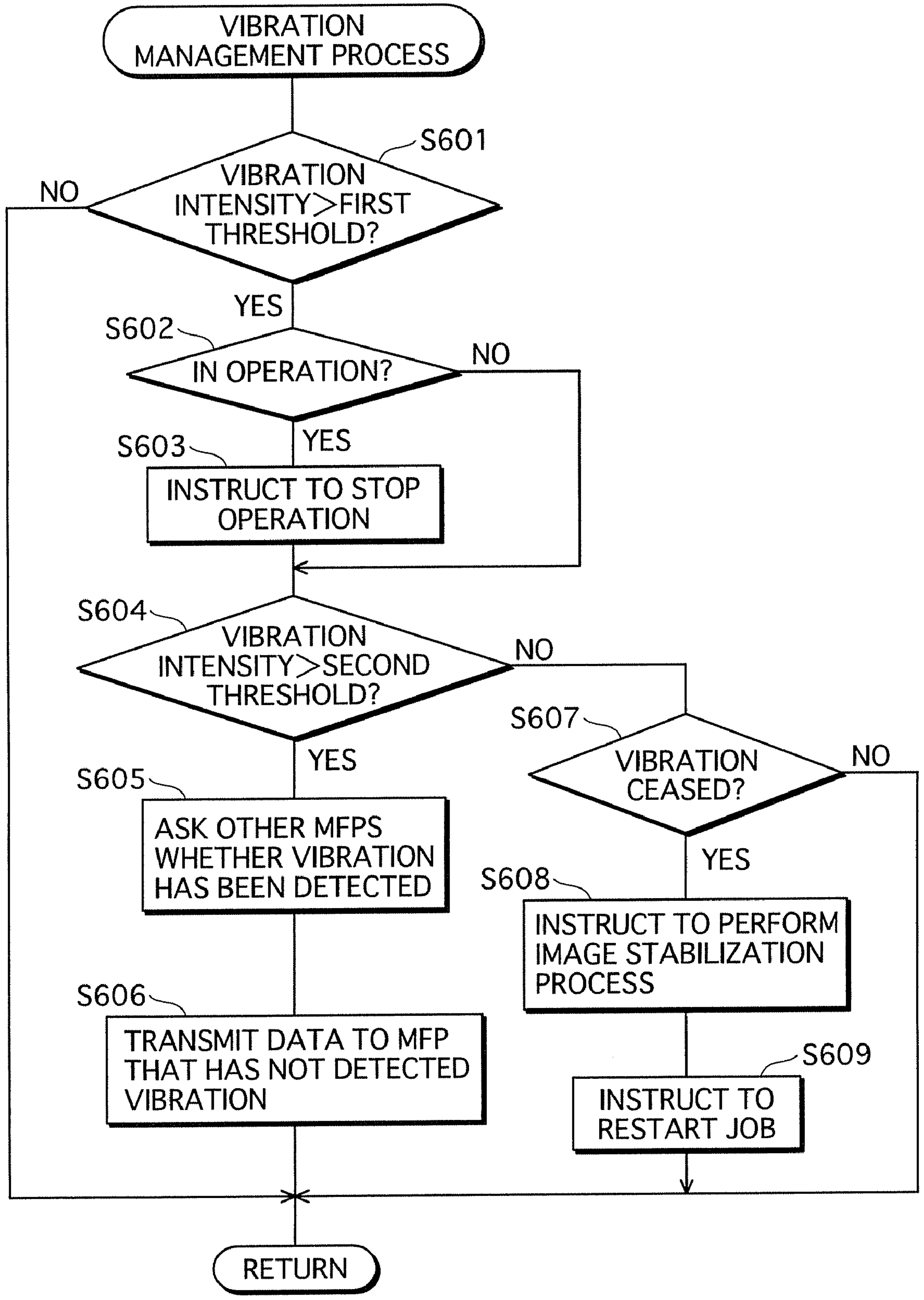
FIG. 6 is a detailed flowchart of a vibration management process of the MFP 100 relating to the embodiment of the present invention.

The following is a detailed description of the vibration management process. The vibration management process judges vibration intensity by using two different thresholds, and performs appropriate processes depending on the judgment result. FIG. 6 is a detailed flowchart of the vibration management process.

First, as shown in FIG. 6, the vibration management process judges whether or not the intensity of the vibration detected by the vibration detector 110 exceeds a first threshold. When the vibration intensity exceeds the first threshold (the "YES" branch of S601), the vibration management process checks whether or not the MFP 100 is performing the image processing. If the MFP 100 is performing the image processing (the "YES" branch of S602), an instruction is issued to the MFP 100 to stop its machinery operation (S603).

Second, the vibration management process judges whether or not the intensity of the vibration detected by the vibration detector 110 exceeds a second threshold, which is larger than the first threshold. If the vibration intensity is below or equal to the second threshold, i.e., if the vibration intensity is larger than the first threshold but is less than or equal to the second threshold (the "NO" branch of S604), the vibration management process judges whether the vibration has ceased.

Upon judging that the vibration has ceased (the "YES" branch of S607), the vibration management process gives an instruction to perform an image stabilization process, especially registration adjustment (S608), before restarting a job that had been executed right before the MFP 100 stopped its machinery operation (S609).

In the vibration management process, when the intensity of the vibration detected by the vibration detector 110 exceeds the second threshold (the "YES" branch of S604), the MFP 100 submits an inquiry to the MFPs 130 through 132 via a network 120 about whether the MFPs 130 through 132 have detected the vibration (S605). The vibration management process then transmits data stored in the data storage device 108 to one of the MFPs 130 through 132 that has not detected the vibration (S606), and terminates its process.

The vibration management process also terminates its process when the vibration intensity is below the first threshold (the "NO" branch of S601), and when the vibration has not ceased (the "NO" branch of S607).

[6] Image Forming Process (S504)

The following is a detailed description of the image forming process (S504). The following description deals especially with a process involved with the vibration management process, which is part of the image forming process.

Figure 7:
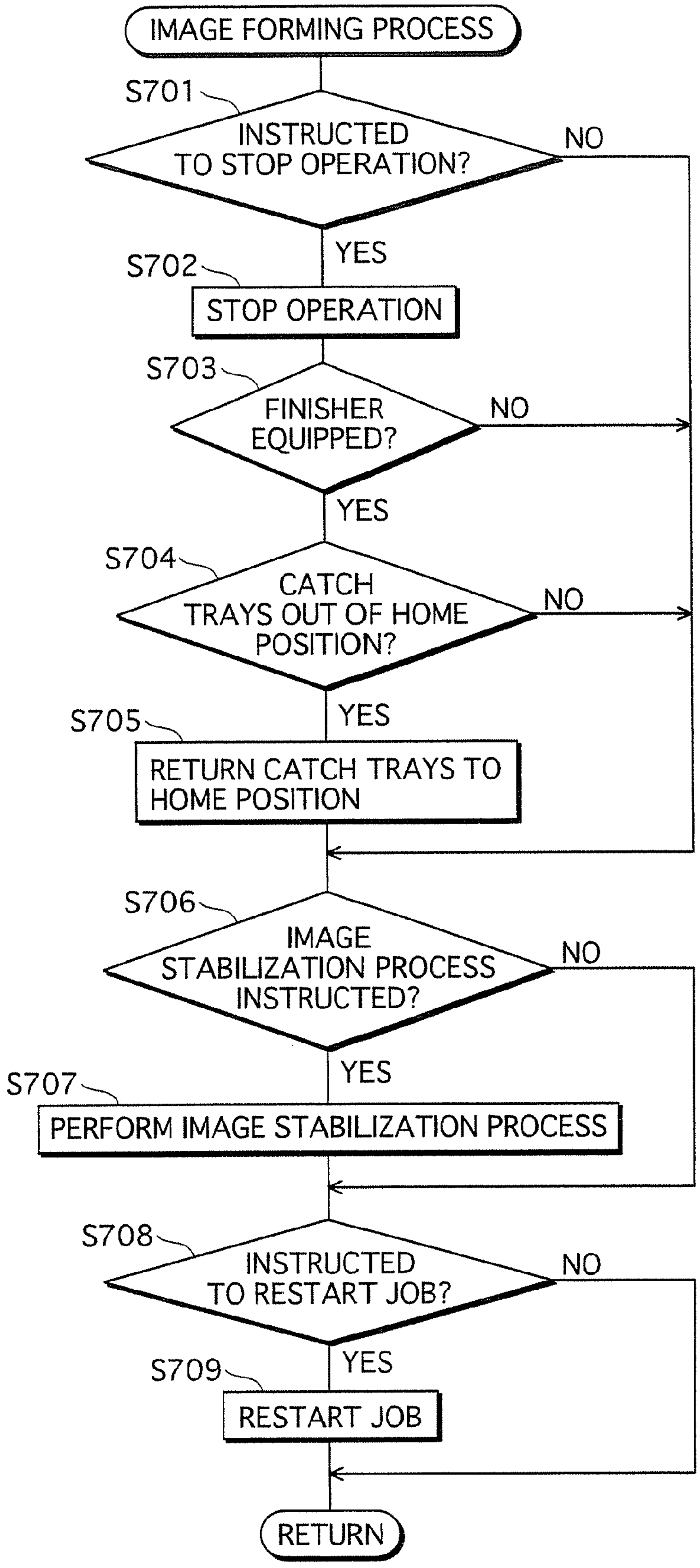
FIG. 7 is a flowchart illustrating part of the image forming process of the MFP 100 relating to the embodiment of the present invention, the part being involved with the vibration management process.

FIG. 7 is a flowchart illustrating part of the image forming process, the part involved with the vibration management process. The image forming process confirms the instruction issued during the vibration management process, and performs appropriate processes in accordance with the confirmation result. First, as shown in FIG. 7, the image forming process stops the machinery operation of the MFP 100 (S702) upon receiving the instruction to do so (the "YES" branch of S701). This eliminates a paper jam and other troubles caused by the earthquake.

Second, the image forming process confirms whether or not the MFP 100 is equipped with the finisher 300, and if so (the "YES" branch of S701), locates the position of the finisher 300, including the first catch tray 301. If the finisher 300 is not at the home position (the "YES" branch of S704), the finisher 300 is lowered back to the home position (S705). Here, with the finisher 300 located at the home position, the center of gravity of the MFP 100 is low. This construction prevents the MFP 100 from falling down due to the earthquake.

Third, the image forming process confirms whether or not the instruction to perform the image stabilization process has been issued. If this instruction has been issued (the "YES" branch of S706), the image forming process executes the image stabilization process (S707). The image forming process then confirms whether or not an instruction to restart the job has been issued, and if issued (the "YES" branch of S708), restarts the processing of the job that has been interrupted since the MFP stopped its machinery operation (S709).

[7] Modification Examples

Although the present invention has been described based on the embodiment discussed above, the present invention is not limited thereto. The present invention can be realized by the following modification examples as well.

(1) First Modification Example

In the above embodiment, the present invention has used 6 the vibration detector that measures the vibration intensity by compression of the piezoelectric element having the weight mounted on top thereof. The present invention, however, may instead use any other type of vibration detector.

Figure 8:
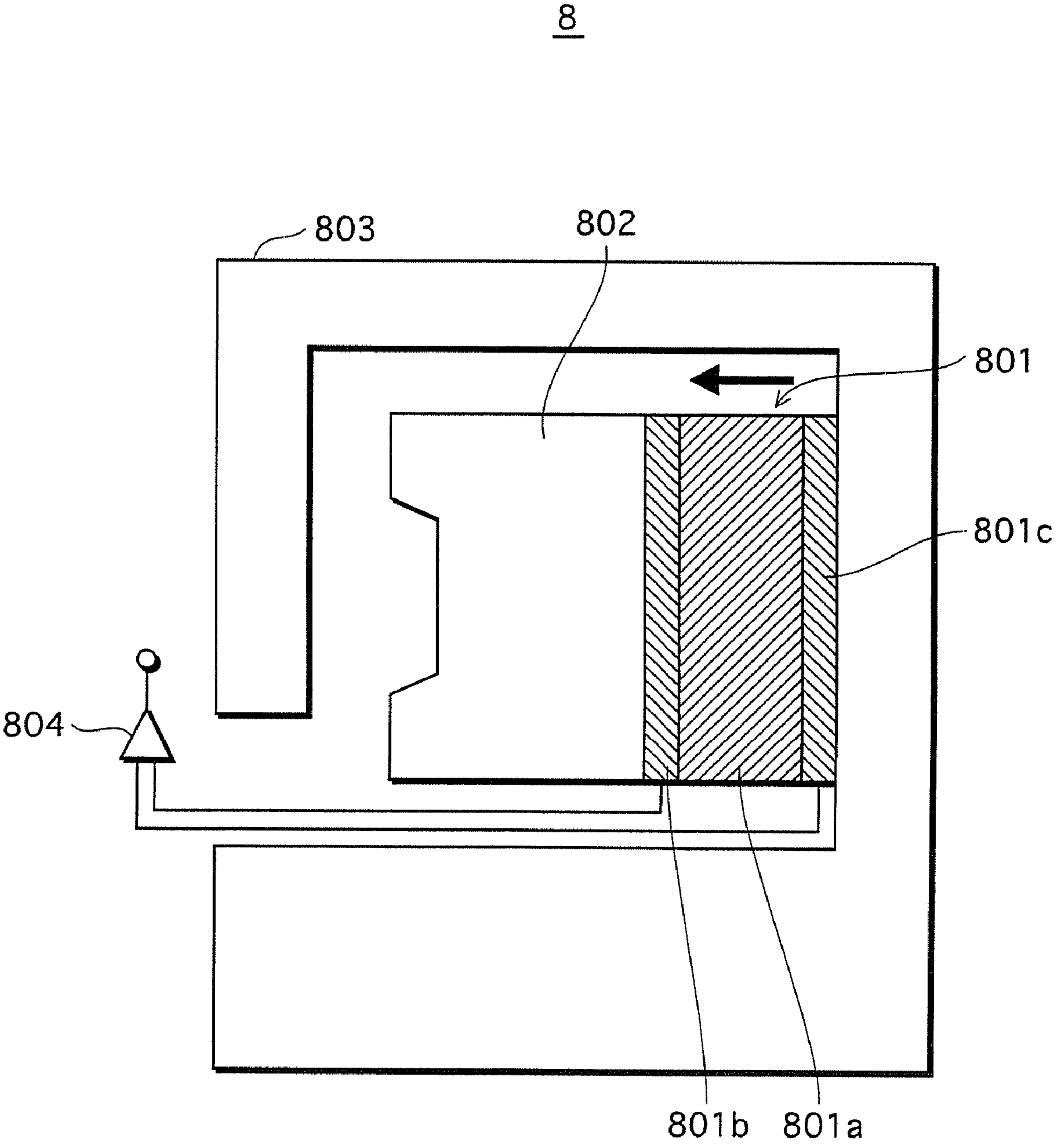
FIG. 8 is a cross-sectional view illustrating a main structure of a vibration detector relating to a first modification example of the present invention.

The any other type of vibration detector includes a shear mode vibration detector. FIG. 8 is a cross-sectional view illustrating a main structure of a vibration detector of the present modification example. As shown in FIG. 8, the vibration detector 8 includes: a piezoelectric element 801; a weight 802; a base 803; and an amplifier 804.

The piezoelectric element 801 is comprised of a piezoelectric material 801*a* whose both ends in a polarization direction are attached to electrodes 801*b* and 801*c*. The weight 802 is attached to one side of the piezoelectric element 801 in a main direction. The piezoelectric element 801 and the weight 802 are placed within the base 803. The piezoelectric element 801 generates a voltage by getting compressed and expanded. The generated voltage is increased by the amplifier 804.

In this construction, an earthquake shaking causes the piezoelectric material 801*a* to be compressed and expanded. Therefore, vibration can be detected in the present modification example just like in the above embodiment.

Instead of the vibration detector, the present invention may use an acceleration sensor that detects the vibration by, for example, changes in any of the following: capacitance; electrical resistance that is measured using a strain gauge, or is caused by the piezoresistive effect; frequency; and interference in fiber optics. The present invention achieves a desired effect using any vibration detection method, as far as the method can measure the vibration intensity.

(2) Second Modification Example

The image stabilization process generically refers to a process for stabilizing an image to be printed. When characteristics of components and processing tasks (i.e., characteristics of a photoconductive drum and developing/charging characteristics) change due to environmental, durability and other reasons, a color and density of a printed image consequently change and the image thus becomes unstable. The image stabilization process restrains such changes and maintains the image stability. The image stabilization process includes: a marking laser intensity adjustment; a toner concentration adjustment; a gamma detection/adjustment; and a registration adjustment.

In the present invention, the image stabilization process preferably deals with components and processing tasks that are affected by the earthquake shaking. For example, when printing in color, the MFP 100 may develop a problem of color shift due to the earthquake shaking. To prevent such a color shift, the MFP 100 needs to make the registration adjustment as part of the image stabilization process (S707).

In the registration adjustment, the MFP 100 prints a predetermined pattern in order to adjust the color shift associated with misregistration of each color in a print engine.

Figure 9:
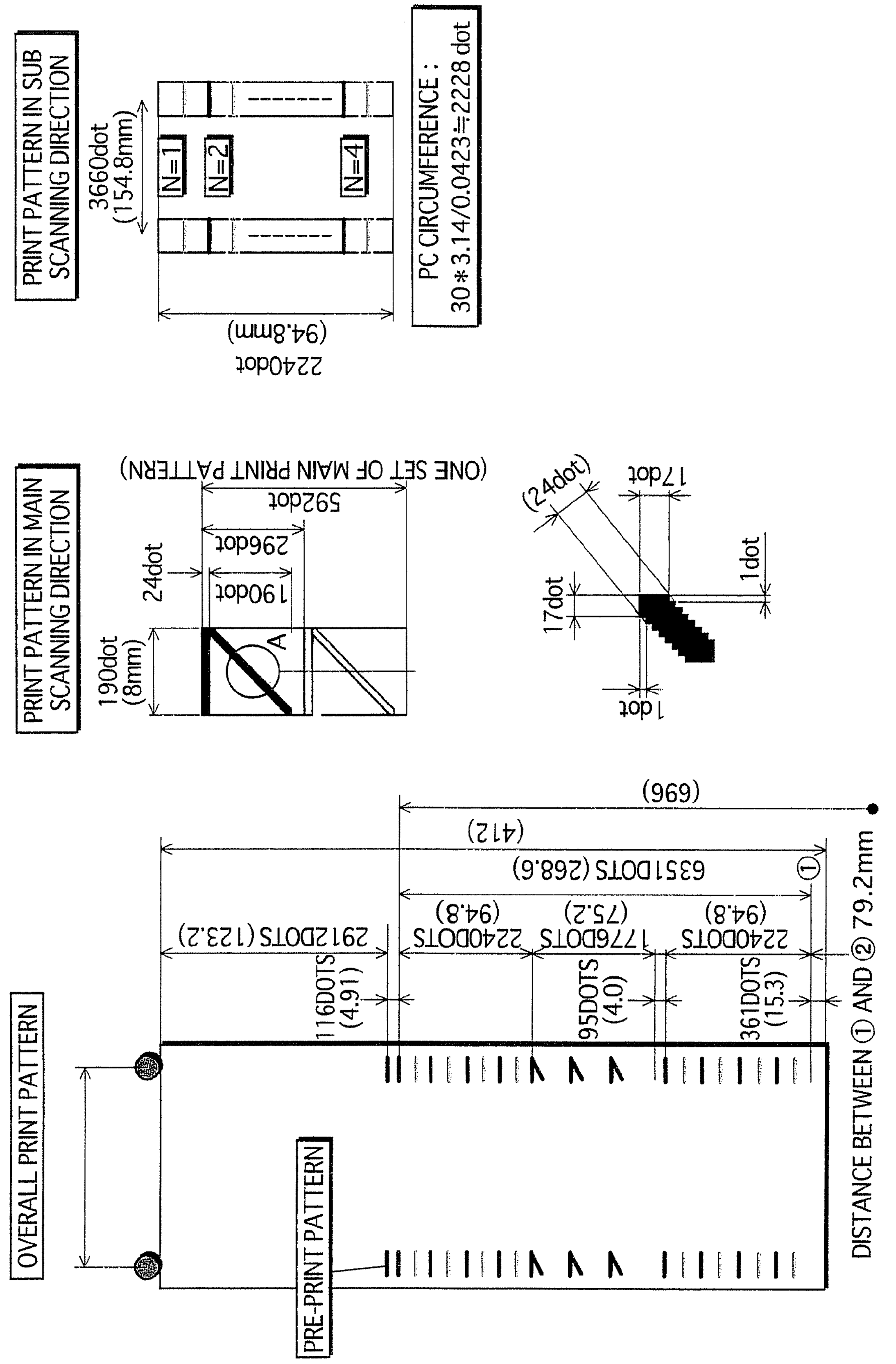
FIG. 9 shows exemplary print patterns used for a registration adjustment relating to a second modification example of the present invention.

The registration adjustment detects a position of this pattern using a sensor to obtain adjustment values for: a main scan offset; a sub scan offset; and a video clock. FIG. 9 shows exemplary print patterns used for the registration adjustment. As shown in FIG. 9, there are two patterns to be printed, one in a main scanning direction, and the other in a sub scanning direction. With use of these print patterns, the adjustment values can be obtained in the following steps.

Figure 10:
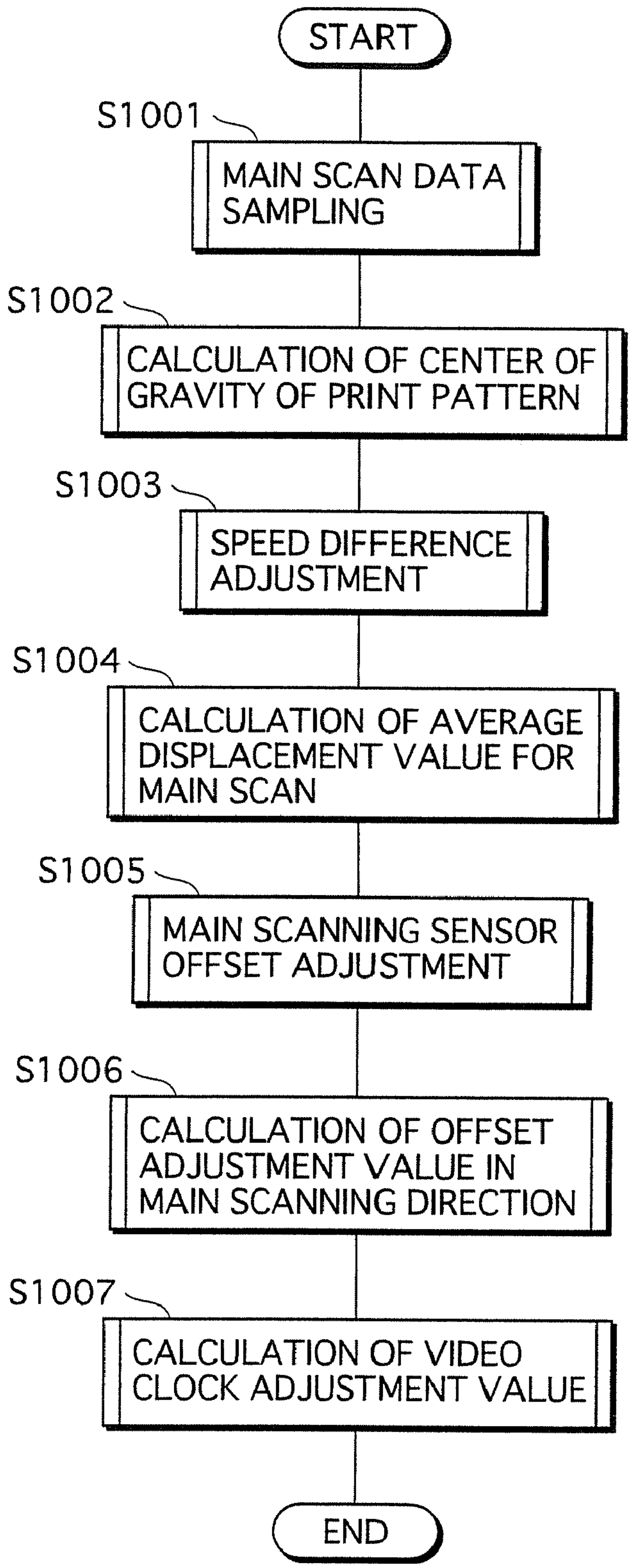
FIG. 10 is a flowchart illustrating processes to obtain adjustment values for a main scan offset and a video clock, the processes being part of a registration adjustment relating to the second modification example of the present invention.

FIG. 10 is a flowchart illustrating processes to obtain adjustment values for the main scan offset and the video clock. Here, as shown in FIG. 10, the following processes are executed sequentially in listed order: a main scan data sampling (S1001); a calculation of center of gravity of print pattern (S1002); a speed difference adjustment (S1003); a calculation of average displacement value for main scan (S1004); a main scanning sensor offset adjustment (S1005); a calculation of offset adjustment value in main scanning direction (S1006); and a calculation of video clock adjustment value (S1007).

The main scan data sampling (S1001) is a process for sampling an adjustment pattern that has been transferred onto a transfer belt by means of an IDC-based sensor. The sampling of the adjustment pattern is conducted every two main scan lines.

The calculation of center of gravity of print pattern (S1002) is a process for locating a center of gravity of the print pattern.

The speed difference adjustment (S1003) is a process for synchronizing a belt speed to a predetermined value.

The calculation of average displacement value for main scan (S1004) is a process for obtaining an average distance between a main scan registration position of each unit and a position of K (a color black).

The main scanning sensor offset adjustment (S1005) is a process for adjusting a position of the main scanning sensor to a predetermined position.

The calculation of offset adjustment value in main scanning direction (S1006) is a process for obtaining an offset adjustment value in a main scanning direction, by adding (i) a shift amount from K detected by a left sensor to (ii) a value obtained by adjusting the video clock from a Start-Of-Scan (SOS) position to a position of the left sensor.

The calculation of video clock adjustment value (S1007) is a process for obtaining a video clock adjustment value from a distance between a left pattern and a right pattern.

Figure 11:
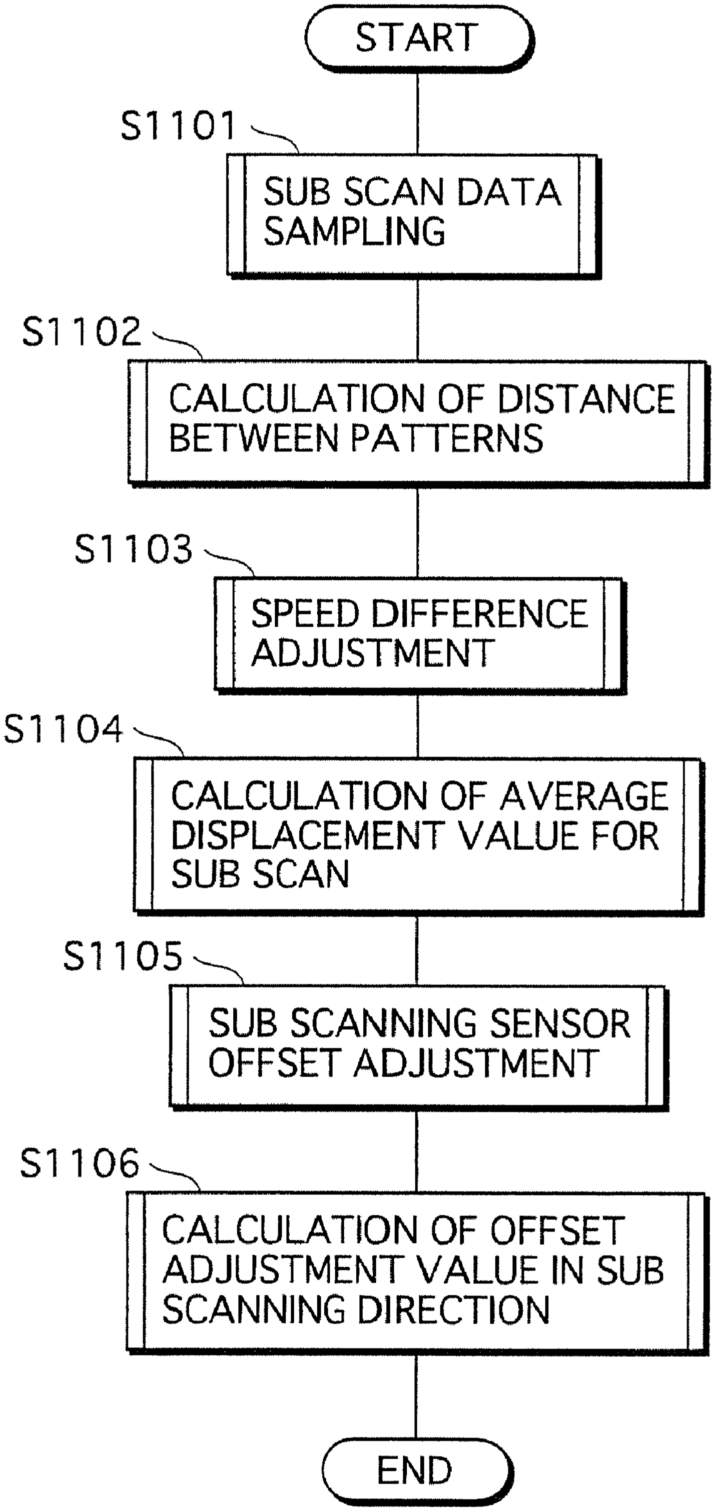
FIG. 11 is a flowchart illustrating processes to obtain an adjustment value for a sub scan offset, the processes being part of a registration adjustment relating to the second modification example of the present invention.

FIG. 11 is a flowchart illustrating processes to obtain an adjustment value for the sub scan offset. Here, as shown in FIG. 11, the following processes are executed sequentially in listed order: a sub scan data sampling (S1101); a calculation of distance between patterns (S1102); a speed difference adjustment (S1103); a calculation of average displacement value for sub scan (S1104); a sub scanning sensor offset adjustment (S1105); and a calculation of offset adjustment value in sub scanning direction (S1106).

The sub scan data sampling (S1101) is a process for reading the adjustment pattern that has been transferred onto the transfer belt by means of the IDC-based sensor. The reading of the adjustment pattern is conducted every two sub scan lines.

The calculation of distance between patterns (S1102) is a process for calculating a distance between (i) a center of gravity of a registration pattern formed by each color (excluding K) and (ii) a center of gravity of a registration pattern formed by K.

The speed difference adjustment (S1103) is a process for synchronizing the belt speed to the predetermined value.

The calculation of average displacement value for sub scan (S1104) is a process for calculating an average gap between a registration distance following the speed adjustment and a standard (predetermined) registration distance.

The sub scanning sensor offset adjustment (S1105) is a process for adjusting a position of the sub scanning sensor to a predetermined position thereof.

The calculation of offset adjustment value in sub scanning direction (S1106) is a process for obtaining an offset adjustment value in a sub scanning direction from the average displacement value for sub scan.

(3) Third Modification Example

The finisher, although included in the MFP according to the above embodiment, is not a necessity. The present invention still provides the same benefit described hereinbefore when applied to an image forming apparatus without the finisher.

(4) Fourth Modification Example

Preferably, in the vibration management process (S503), the MFP 100 submits an inquiry to other MFPs that have been pre-registered with the MFP 100 about whether or not the other MFPs have detected the vibration. This is because the MFP 100 should take prompt measures to keep the image data in a safe condition in case of an earthquake.

There may be cases where all of the other MFPs pre-registered with the MFP 100 have detected the vibration. In such cases, the MFP 100 may submit an inquii-y to all the MFPs and devices that are connected thereto about whether or not these MFPs and devices have detected the vibration, so that the MFP 100 can transmit the data to an MFP or a device that have not detected the vibration.

(5) Fifth Modification Example

In order to judge whether or not the vibration has ceased in the vibration management process (S503), the MFP 100 may measure the vibration intensity at regular time intervals. Here, when the vibration intensity returns to within a certain threshold, the MFP may judge that the vibration has ceased. The MFP 100 may judge that the vibration has ceased also when the vibration intensity returns to the certain threshold or below a, given number of times or more.

Although the object of the present invention is to prevent the degradation of image quality caused by the earthquake, the present invention can also prevent the degradation of image quality due to any other vibration that is not induced by the earthquake.

(6) Sixth Modification Example

There are cases where untransferred toner particles and recording papers, on which the images are yet to be formed, are left in the MFP 100. In such cases, the MFP 100 needs to remove and discharge these toner particles and recording papers. Afterward the MFP 100 restarts the unfinished, job of forming images from the image data onto new recording media (S709).

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be constructed as being included therein.

What is claimed is:

1. An image forming apparatus for forming a color image on a recording medium in accordance with image data, the image forming apparatus comprising:

a registration adjuster for making a registration adjustment by adjusting an image forming position of each color;

a detector for detecting an intensity of a vibration;

a transmitter for transmitting the image data to another apparatus via a network; and a controller for (i) interrupting an image formation if the intensity of the vibration is judged to be larger than a first threshold, (ii) instructing the transmitter to transmit the image data of the interrupted image formation to the another apparatus if the intensity of the vibration is judged to be larger than a second threshold that is larger than the first threshold, and (iii) after the vibration has ceased, instructing the registration adjuster to make the registration adjustment and then restarting the interrupted image formation.

2. The image forming apparatus of claim 1, further comprising:

a scanner for generating the image data by scanning an original, wherein the controller instructs the transmitter to transmit only the image data generated by the scanner to the another apparatus.

3. The image forming apparatus of claim 1, wherein after the vibration has ceased, the controller acquires the image data that has been transmitted to the another apparatus and restarts the interrupted image formation using the acquired image data.

4. The image forming apparatus of claim 2, further comprising:

an inquirer for submitting an inquiry to the another apparatus via the network about whether the another apparatus has detected vibration, wherein if the intensity of the vibration is judged by the image forming apparatus to be larger than the second threshold, the controller instructs the inquirer to submit the inquiry to the another apparatus about whether the another apparatus has detected the vibration, and if the another apparatus has not detected vibration, the controller instructs the transmitter to transmit the image data of the interrupted image formation to the another apparatus.

5. The image forming apparatus of claim 1, further comprising:

a finisher that includes a plurality of catch trays and slides up and down according to which one of the plurality of catch trays receives the recording medium with the color image formed thereon, wherein if the intensity of the vibration is judged to be larger than the first threshold, the controller instructs the finisher to slide down to a lowest point.

6. An image forming apparatus for forming a color image on a recording medium in accordance with image data, the image forming apparatus comprising:

a detector for detecting an intensity of a vibration; and a finisher that includes a plurality of catch trays and slides up and down according to which one of the plurality of catch trays receives the recording medium with the color image formed thereon, wherein if the intensity of the vibration is judged to be larger than a first threshold, the finisher is instructed to slide down to a lowest point.

* * * * *